United States Patent [19]

Holley

[11] E Patent Number: Re. 31,619

[45] Reissued Date of Patent: Jul. 3, 1984

[54] SWEEPER BRISTLE AND METHOD OF MAKING

[75] Inventor: John D. Holley, Montgomery, Ala.

[73] Assignee: Holley Engineering Company, Inc., Montgomery, Ala.

[21] Appl. No.: 505,282

[22] Filed: Jun. 17, 1983

Related U.S. Patent Documents

Reissue of:

[64] Patent No.: 4,367,564
Issued: Jan. 11, 1983
Appl. No.: 254,174
Filed: Apr. 14, 1981

[51] Int. Cl.[3] ..... A46D 1/04; A46B 7/10

[52] U.S. Cl. ..... 15/179; 15/159 A; 15/DIG. 3; 15/186; 15/55; 264/243; 264/258

[58] Field of Search ..... 15/55, 159 A, 159 R, 15/186, 187, 188, 174, 179, 180, 181, 182, 183, DIG. 3; 300/21; 264/243, 257, 258; 428/250, 252, 295, 397, 306, 365, 379

[56] References Cited

U.S. PATENT DOCUMENTS

| | | | |
|---|---|---|---|
| 1,397,842 | 11/1921 | Netzel . | |
| 2,226,768 | 12/1940 | Harrison . | |
| 2,690,769 | 10/1954 | Brown | 428/250 X |
| 2,984,053 | 5/1961 | Peterson | 15/159 A |
| 3,016,554 | 1/1962 | Peterson | 15/179 X |
| 3,237,232 | 3/1966 | Holley | 15/179 |
| 3,403,070 | 9/1968 | Lewis, Jr. | 15/179 A |
| 3,649,984 | 3/1972 | Kershaw et al. | 15/179 |
| 4,144,610 | 3/1979 | Moore et al. | 15/183 X |
| 4,184,223 | 1/1980 | Price | 15/179 |

*Primary Examiner*—Peter Feldman
*Attorney, Agent, or Firm*—Kerkam, Stowell, Kondracki & Clarke

[57] ABSTRACT

A bristle for use in a railway roadbed broom is disclosed. The bristle is made of an elongate elastomeric core member with two elastomeric skin members bonded around it. Pieces of reinforcing stranded material are used to strengthen the interfaces between the elastomeric members.

33 Claims, 4 Drawing Figures

SWEEPER BRISTLE AND METHOD OF MAKING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a bristle for a broom and method of making the bristle. More specifically, this invention relates to a bristle for use in a railroad bed or track.

2. Description of the Prior Art

The use of bristles for a broom machine adapted for cleaning a railway road bed or track is well known to the art. Generally, such bristles are mounted on a rotary sweeping element and are commonly used for sweeping ballast and other debris along the railway track.

The ballast is usually a thick layer of crushed limestone which is placed between and along side of the rails. Preferably, the top service of the ballast should be level with or slightly below the railway ties. Unfortunately, when new ballast is dumped onto a railway roadbed, the ballast is not properly and evenly distributed. There may be spaces between rails which are not properly filled in with ballast. Additionally, the rails, which should be free of loose ballast, may be at least partially covered by ballast.

In order to evenly distribute the ballast and clear ballast from the tops of the railway ties, it is known to use rotary sweeping cores. However, because of the extremely harsh wear on the bristles commonly mounted, to such cores, the bristles are subject to breakage if they do not yeild properly. Additionally, as will be readily appreciated, the limestone or similar ballast will cause an extreme amount of wear on the bristle elements.

Among prior art Patents, my previous U.S. Pat. No. 3,237,232, issued on Mar. 1, 1966, discloses the use of hollow, resilient tube-like bristles on a rotary sweeper core. The generally hollow bristle element is mounted to a rotary sweeping core by an elongate stiffner element extending into the interior of the bristle.

The patent to Kershaw et al., U.S. Pat. No. 3,649,984, issued on Mar. 21, 1972, discloses a bristle element having a core made of a bundle of parallel straight spring-steel spines or wires incased in a resilent sheath.

The Price U.S. Pat. No. 4,184,223, issued on Jan. 22, 1980, discloses a sweeper bristle element having a knob at one end. Additionally, a nylon or similar reinforcing material reinforces the solid elastomeric stem to which the knob is attached.

Although the prior art bristles have been generally useful, they have been subject to a number of significant disadvantages. Specifically, the longer lasting of the prior art bristles have often been complex in construction and expensive to manufacture. Those prior art bristles which may be made inexpensively and efficiently are generally prone to wearing out and/or breaking.

Accordingly, it is an object of the present invention to provide a railway roadbed bristle which is simple in construction.

A further object of the present invention is to provide a railway roadbed bristle of elastomeric material and configured to minimize the risk of breakage.

Yet another object of the present invention is to provide a railway roadbed bristle designed to accomodate a great deal of use before wearing out.

Yet another object of the present invention is to provide a method for making railway roadbed bristles which is inexpensive, and efficient.

SUMMARY OF THE INVENTION

These and other objects of the present invention which will be apparent as the description proceeds are accomplished by providing an elongate bristle having at least a first elongate elastomeric member, a second elongate elastomeric member distinct from the first elongate elastomeric member and a first piece of reinforcing strand material. The first elongate member and second elongate member are bonded together with the first piece of reinforcing stranded material there between. The first piece of reinforcing stranded material is further from a bristle center of gravity axis than from the nearest external surface of the bristle. The bristle further includes a third elongate elastomeric member bonded to the second elongate elastomeric member with a second piece of reinforcing stranded material there between. Preferably, the first elongate elastomeric member is U shaped in cross section and the second elongate elastomeric member fills the inside of the U. Preferably, the cylindrically curved external surface corresponding to the base of the U serves as a sweeping surface when the bristles are mounted on a rotary sweeping core.

*The present invention may alternately be described as comprising a road bed cleaning solid reinforcing elastomeric elongate bristle including; elastomeric material having a cross section with an external U-shaped sweeping curve and an external trailing straight line connecting tops of the U-shaped sweeping curve which is part of an external sweeping surface extending lengthwise on the bristle; and a first piece of reinforcing stranded material disposed further from a cross section center of gravity than from the nearest external surface of the bristle and a portion of the first piece of reinforcing stranded material follows the contours of the external sweeping surface with elastomeric material between this portion of the first peice of reinforcing stranded material and the external sweeping surface. The cross section of the bristle at least somewhere along its length has the first piece of reinforcing stranded material extending in a U shape between two noncontiguous end points. Further, a cross section of the bristle at least somewhere along its length includes reinforcing stranded material disposed in a line, parallel to, and just underneath the external trailing straight line. The bristle is a solid mass of elastomeric material commonly cured with the first piece of reinforcing material marking off a skin portion from a core portion. The invention further may include a plurality of these bristles mounted on a rotary sweeping core. The elastomeric material is rubber and the first piece of reinforcing stranded material is nylon. The first piece of reinforcing stranded material is operable to prevent premature cracking and breaking of the bristle at locations of maximum bending stress.*

*The invention may alternately be described as a plurality of road bed cleaning solid reinforced elastomeric bristles mounted to a rotary core, each bristle having: a core portion made of elongated elastomeric material; a skin portion made of elongate elastomeric material; and a first piece of reinforcing stranded material marking off the core portion*

*and the skin portion. Preferably, the skin portion has an external sweeping surface which is U-shaped in cross section. The first piece of reinforcing stranded material is further from a cross section center of gravity than from the nearest external surface of the bristle. A cross section of the bristle at least somewhere along its length includes reinforcing stranded material disposed in a line, parallel to, and just underneath an external trailing straight line and disposed further from a bristle cross section center of gravity than from the nearest external surface of the bristle.*

The present invention further includes a process for making sweeper bristles wherein an elongate cavity of a mold is first lined with an elastomeric lining having a concave portion. A first piece of reinforcing stranded material is installed into the concave portion of the elastomeric lining. An elongate elastomeric core member in inserted into the concave portion of the elastomeric lining. Next, a second piece of reinforcing strande material is installed on top of the elongate elastomeric core member. Following the placement of an elastomeric layer on top of the second piece of reinforcing material, the mold contents are subjected to heat and pressure, thereby forming a bristle by the bonding of the elastomeric lining to the elongate-elastomeric core member with the first piece of reinforcing stranded material there between and the bonding of the elongate elastomeric core member to the elastomeric layer with the second piece of reinforcing material there between. Preferably, the mold has a plurality of parallel elongate cavities separated by walls each of which is lined with a separate piece of elastomeric lining whereas the first and second pieces of reinforcing stranded material are installed to extend into a plurality of the mold cavities and the elastomeric layer is placed to extend on the top of a plurality of the mold cavities such that the heating of the mold contents will result in a mold product with a plurality of elongate portions joined by relatively thin portions. Upon the cutting of the mold product at each of the thin portions, the mold product yields a plurality of sweeper bristles.

DETAILED DESCRIPTION OF THE INVENTION

Figure 1:
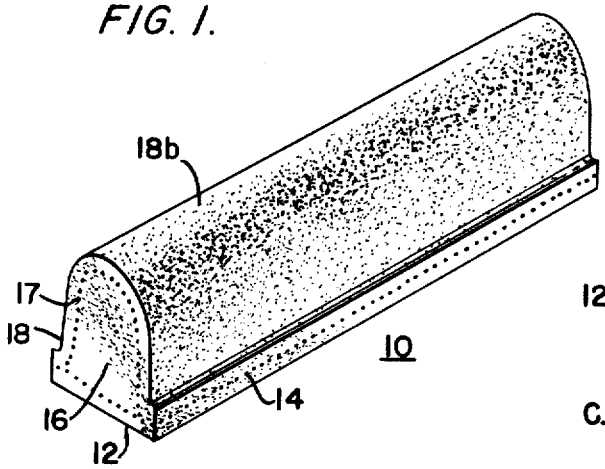
FIG. 1 is a perspective view of a broom bristle of the present invention.

Turning now to FIG. 1, a railway roadbed bristle according to the present invention has been shown. The bristle 10 includes a first elongate elastomeric member 18 which is generally U shaped in cross section having a concave portion extending along its length between two noncontiguous boundary portions (e.g. the points on the U). Filling the interior of the U shape and bonding to the inside of the first elongate elastomeric member is as second elongate elastomeric member 16, a first piece of reinforcing stranded material 17 being bonded there between. A third elongate elastomeric member 12 is bonded to the second elastomeric member 16 with a second piece of reinforcing stranded material bond 14 being bonded there between. The first or U shaped elongate elastomeric member 18 has a cylindrically curved surface 18B on the external portion of the base of the U. As will be discussed presently, this external cylindrically curved surface 18B is used as the sweeping or leading surface when the bristle 10 is mounted on a rotary sweeping core.

Figure 3:
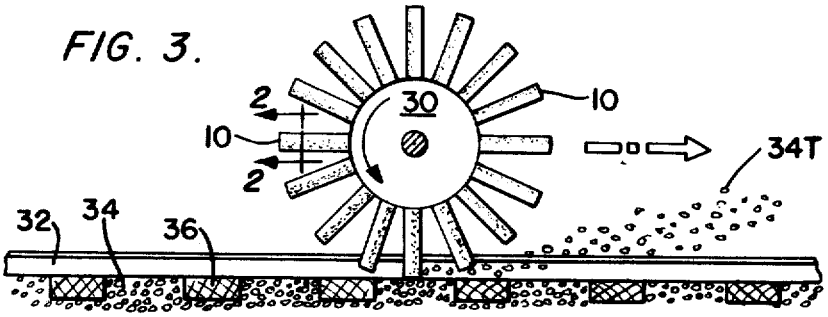
FIG. 3 is a simplified side view showing the operation of a broom according to the present invention.

Referring now to FIG. 3 of the drawings, there is shown a simplified drawing to illustrate the operation of the bristles 10 of the invention. Specifically, a series of bristles 10 would be mounted around a rotary core 30. The bristles 10 may be mounted by clamps (not shown) or any other manner commonly used and well known in the prior art. The rotary core 30 may be mounted on a railway car (not shown) as is well known in the prior art. As the rotary core moves along the railway track 32, the ballast 34 will be redistributed into the gaps between the ties 36 and generally swept off the ties 36. Curved surface 18B will be the sweeping or leading surface on each bristle. Specifically the ballast will be thrown generally forward in the direction of movement of rotary core 30 as is indicated by ballast 34 T in the drawing. The ballast 34 will be generally re-distributed in an even manner along the surface of the track as is desirable.

Figure 2:
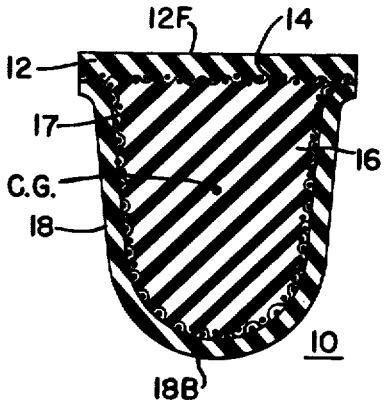
FIG. 2 is a cross sectional view of the present bristle taken along lines 2—2 of FIG. 3.

Turning now to FIG. 2, for viewing in conjunction with both FIG. 1 and FIG. 3, there is shown a cross sectional view taken along lines 2—2 of FIG. 3. Specifically, the cross section of a bristle 10 is shown. Note that the cross section could be taken anywhere along the length of the bristle 10 in as much as the cross section is the same any place on its length or axis. As is shown in FIG. 2, the second elongate elastomeric member 16 constitutes a core surrounded, except on its ends, by the first elastomeric member 18 and the third elastomeric member 14. It will be readily appreciated that the first elongate elastomeric member 18 and the third elongate elastomeric member 12 together constitute a skin covering the elongate elastomeric core member 16 at any place along its length. Moreover, the first and second pieces of reinforcing stranded material 17 and 14 are bonded co-extensively with the interface between the core member 18 and the skin members 14 and 18. As previous mentioned, the cylindrically curved external surface 18 B is used as a sweeping surface. The third elongate elastomeric or skin member 12 has an external generally flat surface 12F which will be the trailing surface when the bristle is in operation on a rotary sweeping core. As clearly shown in FIG. 2 the first, second, and third elastomeric members are distinct from each other. Further, FIG. 2 shows that the bristle is solid, not hollow, in construction.

*As clearly shown in FIG. 2, the elastomeric material of member 18 which constitutes a skin portion of the bristle 10 has a cross section with the external U shaped sweeping curve. The U-shaped sweeping curve is a part of the external sweeping surface 18B extending lengthwise on the bristle. The reinforcing stranded material piece 17 clearly follows the contours of the external sweeping surface 18B with elastomeric material between the external sweeping surface and the reinforcing stranded material 17.*

*As mentioned above, the first piece of reinforcing stranded material 17 has a cross section (FIG. 2) which extends in a U shape between two noncontiguous end points. Further, the reinforcing stranded material piece 14 is disposed in a line (as viewed in cross section of FIG. 2) which line is parallel to and just underneath the external trailing straight line defined by trailing or following surface 12F taken in cross section.*

*The elongated elastomeric members 12, 16, and 18 are distinct in that they are marked off from each other by the stranded reinforcing material. As is discussed in detail below, they are a solid mass of rubber which is commonly cured with the reinforcing stranded material between a skin portion of the bristle including members 12 and 18 and a core portion of the bristle constituted by member 16.*

An important aspect of the present invention is the use of reinforcing stranded material which is near the external surfaces of the bristle 10. More specifically, as shown in FIG. 2, the pieces of reinforcing stranded material 14 and 17 are further from the center of gravity axis (labeled C. G.) than from the nearest external surface of the bristle. By installing the reinforcing stranded material near the surface of the bristle, the strength of the reinforcing stranded material in tension will prevent premature cracking and breaking of the bristle at the point of maximum bending stress. Additionally, this reinforcing stranded material installed near the surface will provide greater stiffness of the bristles leading to better sweeping action.

In addition to the placement of reinforcing stranded material near the surface of the bristle, the present invention is especially advantageous in the shape and contours of the individual pieces making up the bristle element 10. More specifically, the U shaped interior surface of skin or first elongate elastomeric 18 is especially advantageous in cooperating with the reinforcing stranded material 17 to distribute any stresses caused by the bristle hitting a piece of ballast or similar debris. The contours at the interface between core member 16 and skin member 18 causes any such stresses to be distributed throughout a wide area thereof. The third elongate elastomeric or skin member 12 is bonded to the curved skin member 18, thereby allowing some of the stress on curved skin member 18 to be transmitted to the backside of core member 16 by way of flat skin member 12 and reinforcing material 14 disposed in between flat skin member 12 and the core member 16. Further, the use of a curved leading or sweeping surface 18B is advantageous in providing a sideways (into or out of the plain of FIG. 3) component to the velocity imparted to the ballast material 34T. This will tend to evenly distribute the ballast throughout the width of the roadway track, instead of merely throwing it along the length of the track. The cylindrically curved sweeping surface 18B is especially adapted to hold up for a long period of use under harsh conditions.

Figure 4:
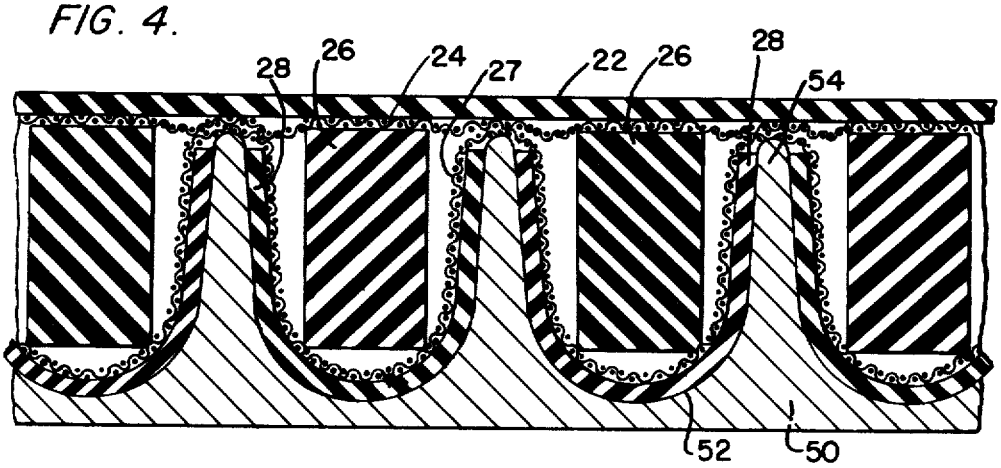
FIG. 4 is an end view of a mold and parts used to make bristles according to the present invention.

Turning now to FIG. 4, a method of making a bristle will presently be discussed. A mold 50 having a series of elongate cavities 52 separated by walls 54 is initially lined with a elastomeric lining 28. Preferably, a separate piece of elastomeric lining 28 is placed in each of the series of generally parallel elongate cavities. Each piece of elastomeric lining 28 is U-shaped with a concave portion. Note that those numbers in FIG. 4 in the 20 series generally correspond by a difference of 10 to the numbers of FIG. 1 and FIG. 2 in the 10 series. For example, the elastomeric lining 28 will correspond to the first elongate elastomeric member 18 in the bristle 10 produced by the process of molding illustrated in FIG. 4.

Following the lining of the mold cavity with elastomeric lining, a first piece of reinforcing stranded material 27 is distributed throughout a plurality of the mold cavities 52 as shown. An elongate elastomeric core member 26 is inserted into the concave portion of the elastomeric lining 28. A second piece of reinforcing stranded material 24 is then installed on top of the elongate elastomeric core member, the reinforcing stranded material 24 extending over a number of the similarly situated core members 26. Next, an elastomeric layer is placed on top of the second piece reinforcing stranded material, the elastomeric layer also extending throughout or over several of the mold cavities 52. The loaded mold should now be placed in a molding machine which consists of upper and lower heated plates arranged to provide a clamping force on the mold of about 120 pounds per square inch which presses the raw rubber or similar elastomeric material and the nylon or similar reinforcing stranded material into a solid mass in the mold and heat cures the raw rubber into a solid section securely bonding the rubber and reinforcing material in about one hour of curing time. Upon completion of the curing period the mold pressure is released and the mold is removed. As will be readily appreciated, the mold product will be a plurality of elongate portions joined by relatively thin portions, the relatively thin portions corresponding to the walls 54 in between the mold cavities 52. Next, the mold product may be cut at each thin portion, thereby dividing the mold product into a plurality of separate elongate pieces. Although each elongate piece may constitute a sweeper bristle, it is preferred to practice the present inventive process with twelve feet along elongate pieces which may then be cut into twelve or eighteen inch lengths before use as bristles. Preferably, the machine used to make these bristles is a truck tread molding machine which will accept a mold twelve feet long by two feet wide by three inches thick and heat to various temperature ranges well-known in the art. After cutting the mold product along the thin portions, one will obtain twelve elongate pieces, each being twelve feet long and suitable for cutting into a plurality of bristles, the number of bristles being dependent upon the desired length.

Although the various elastomeric members and pieces of the present invention are preferably made of rubber and the reinforcing stranded material is preferably a fabric such as nylon, it will be readily appreciated that the present invention is not so limited except where otherwise noted in the appended claims. More geneally, although specific constructions, steps and features have been discussed in detail, it is to be readily appreciated that these are for illustrative purposes only. Various changes and modifications will readily occur to those of ordinary skill in the art and, accordingly, the scope of the present invention should be determined by reference to the appended claims.

What is claimed is:

1. A roadbed cleaning solid reinforced elastomeric elongate bristle having at least a first elongate elastomeric member, a second elongate elastomeric member distinct from the first elongate elastomeric member and a first piece of reinforcing stranded material; and wherein said first elongate elastomeric member and second elongate elastomeric member are bonded together with said first piece of reinforcing stranded material therebetween, and said first piece of reinforcing stranded material is further from a bristle center of gravity axis than from the nearest external surface of the bristle, and wherein said first elongate elastomeric member includes a curved external surface extending between two noncontiguous boundary portions.

2. The bristle of claim 1 wherein said first elongate elastomeric member includes a concave portion extending along its length, and said second elongate elastomeric member is disposed at least partly within said concave portion of said first elongate elastomeric member.

3. An invention for use in cleaning a roadbed comprising an elongate bristle having at least a first elongate elastomeric member, a second elongate elastomeric member distinct from the first elongate elastomeric member and a first piece of reinforcing stranded material; and wherein said first elongate elastomeric member and second elongate elastomeric member are bonded together with said first piece of reinforcing stranded material therebetween, and said first piece of reinforcing stranded material is further from a bristle center of gravity axis than from the nearest external surface of the bristle, and wherein said first elongate elastomeric member includes a cylindrically curved external surface extending between two noncontiguous boundary portions, and said first stranded material reinforcing piece includes a cylindrically curved portion, and said bristle has a generally flat surface opposite said cylindrically external surface of said first elastomeric member.

4. A roadbed cleaning elongate bristle having at least a first elongate elastomeric member, a second elongate elastomeric member distinct from the first elongate elastomeric member and a first piece of reinforcing stranded material; and wherein said first elongate elastomeric member and second elongate elastomeric member are bonded together with said first piece of reinforcing stranded material therebetween, and said first piece of reinforcing stranded material is further from a bristle center of gravity axis than from the nearest external surface of the bristle, and wherein said bristle further includes a third elongate elastomeric member bonded to said second elongate elastomeric member with a second piece of reinforcing stranded material therebetween, and said third elongate elastomeric member is distinct from said first and second elongate elastomeric member.

5. The bristle of claim 4 wherein said first elongate elastomeric piece includes a cylindrically curved external surface extending between two noncontiguous boundary portions, and said first piece of reinforcing stranded material includes a cylindrically curved portion, and said bristle has a generally flat surface opposite said cylindrically curved external surface of said first elastomeric member, and said generally flat surface is a surface on said third elongate elastomeric member.

6. The bristle of claim 5 wherein said first and second pieces of reinforcing stranded material are made of fabric.

7. An invention for use in cleaning a roadbed comprising an elongate bristle having at least a first elongate elastomeric member, a second elongate elastomeric member distinct from the first elongate elastomeric member and a first piece of reinforcing stranded material; and wherein said first elongate elastomeric member and second elongate elastomeric member are bonded together with said first piece of reinforcing stranded material therebetween, and said first piece of reinforcing stranded material is further from a bristle center of gravity axis than from the nearest external surface of the bristle, and wherein said first elongate elastomeric member is U shaped in cross-section and said second elongate elastomeric member fills the inside of the U, and said first piece of reinforcing stranded material is coextensive with the interface between said first elongate elastomeric member and second elongate elastomeric member.

8. The invention of claim 7 wherein said bristle further includes a third elongate elastomeric member bonded to said second elongate elastomeric member with a second piece of reinforcing stranded material therebetween, and said generally flat surface is a surface on said third elongate elastomeric member, and said first and second pieces of reinforcing stranded material are made of fabric.

9. The invention of claim 8 wherein each of said elongate elastomeric members is made of rubber and each of said first and second pieces of reinforcing stranded material is nylon, and said second pieces of reinforcing stranded material is further from the center of gravity axis of the bristle than from the nearest external surface of the bristle.

10. An invention including a plurality of elongate bristles defined by claim 1 or 4, wherein the bristles are mounted on a rotary sweeping core, each bristle having a cylindrically curved external surface as a sweeping surface.

11. A process for making sweeper bristles, the steps comprising, in order:

(a) lining an elongate cavity of a mold with an elastomeric lining having a concave portion,
(b) installing a first piece of reinforcing stranded material into the concave portion of said elastomeric lining,
(c) inserting an elongate elastomeric core member into the concave portion of said elastomeric lining,
(d) installing a second piece of reinforcing stranded material on top of said elongate elastomeric core member,
(e) placing an elastomeric layer on top of said second piece of reinforcing stranded material,
(f) heating the mold contents, thereby forming a bristle by the bonding of said elastomeric lining to said elongate elastomeric core member with said first piece of reinforcing stranded material therebetween and the bonding of said elongate elastomeric core member to said elastomeric layer with said second piece of reinforcing stranded material therebetween.

12. The process of claim 11 wherein the mold has a plurality of parallel elongate cavities separated by walls, each of which is lined with elastomeric lining with a concave portion of elastomeric lining placed in each of said cavities, said first piece of reinforcing stranded material and said second piece of reinforcing stranded material installed to extend into a plurality of said mold cavities, and said elastomeric layer is placed to extend on the top of a plurality of said mold cavities such that the heating of the mold contents will result in a mold product with a plurality of elongate portions joined by relatively thin portions.

13. The process of claim 12 further including the step of applying pressure to the mold contents at the same time as the heating thereof, the pressure aiding in the bonding.

14. The process of claim 13 further including the step of cutting the mold product at each thin portion, thereby dividing the mold product into a plurality of separate elongate pieces, each elongate piece constituting at least one sweeper bristle.

15. The process of claim 14 further including the step of cutting each elongate piece into a plurality of sweeper bristles.

16. The process of claim 14 wherein each elongate mold cavity is lined with a separate piece of elastomeric lining.

17. The process of claim 16 wherein the elastomeric lining, elongate elastomeric core members, and elastomeric layer are made of rubber, and the first piece of reinforcing stranded material and the second piece of reinforcing stranded material are nylon.

18. The process of claim 17 wherein each piece of elastomeric lining is U-shaped.

19. The process of claim 11 or 18 wherein the elastomeric lining and elastomeric layer are relatively thin compared to the elongate elastomeric core member such that, following the heating and bonding, the stranded material reinforcing pieces will be further from a bristle center of gravity axis than from the nearest external surface of the bristle.

*20. An invention comprising a road bed cleaning solid reinforced elastomeric elongate bristle including:*

*elastomeric material having a cross-section with an external U-shaped sweeping curve and an external trailing straight line connecting tops of said U-shaped sweeping curve, said U-shaped sweeping curve being part of an external sweeping surface extending lengthwise on the bristle; and*

*a first piece of reinforcing stranded material disposed further from a cross-section center of gravity than from the nearest external surface of the bristle and a portion of said first piece of reinforcing stranded material following the contours of said external sweeping surface with elastomeric material between said portion of said first piece of reinforcing stranded material and said external sweeping surface.*

*21. The invention of claim 20 wherein a cross-section of said bristle at least somewhere along its length has said first piece of reinforcing stranded material extending in a U-shape between two noncontiguous end points.*

*22. The invention of claim 21 wherein a cross-section of said bristle at least somewhere along its length includes reinforcing stranded material disposed in a line parallel to and just underneath said external trailing straight line.*

*23. The invention of claim 22 wherein said bristle is a solid mass of elastomeric material commonly cured with said first piece of reinforcing stranded material marking off a skin portion from a core portion.*

*24. The invention including a plurality of bristles as defined by claim 23, wherein the bristles are mounted on a rotary sweeping core.*

*25. The invention of claim 20 wherein said bristle is a solid mass of elastomeric material commonly cured with said first piece of reinforcing stranded material marking off a skin portion from a core portion.*

*26. The invention including a plurality of bristles as defined by claim 25 wherein the bristles are mounted on a rotary sweeping core.*

*27. The invention of claim 20 wherein said elastomeric material is rubber and said first place of reinforcing stranded material is nylon.*

*28. The invention of claim 20 wherein said first piece of reinforcing stranded material is operable to prevent premature cracking and breaking of the bristle at locations of maximum bending stress.*

*29. An invention comprising a plurality of road bed cleaning solid reinforced elastomeric bristles mounted to a rotary sweeper core, each bristle having:*

*a core portion made of elongate elastomeric material;*

*a skin portion made of elongate elastomeric material; and*

*a first piece of reinforcing stranded material marking off said core portion and said skin portion; and*

*wherein said skin portion has an external sweeping surface and wherein said first piece of reinforcing stranded material is further from a cross-section center of gravity than from the nearest external surface of the bristle wherein said external sweeping surface of each bristle is U-shaped in cross-section and a cross-section of each bristle at least somewhere along its length has said first piece of reinforcing stranded material extending in a U-shape between two noncontiguous end points.*

*30. The invention of claim 29 wherein a cross-section of each bristle at least somewhere along its length includes reinforcing stranded material disposed in a line, parallel to, and just underneath an external trailing straight line and disposed further from a bristle cross-section center of gravity than from the nearest external surface of the bristle.*

*31. The invention of claim 29 wherein, for each bristle, said core portion and said skin portion are a solid mass of elastomeric material commonly cured with said first piece of reinforcing material therebetween.*

*32. The invention of claim 31 wherein, for each bristle, said external sweeping surface is curved between two noncontiguous boundary portions.*

*33. A process for making road bed cleaning solid reinforced elastomeric sweeper bristles having:*

*a core portion made of elongate elastomeric material;*

*a skin portion made of elongate elastomeric material; and*

*a first piece of reinforcing stranded material marking off said core portion and said skin portion; and*

*wherein said skin portion has a curved external sweeping surface which extends between two noncontiguous boundary portions and wherein said first piece of reinforcing stranded material is further from a cross-section center of gravity than from the nearest external surface of the bristle, the steps comprising: placing said first piece of reinforcing stranded material between said skin portion and said core portion, and curing said skin portion and said core portion together into a solid mass with said first piece of reinforcing stranded material therebetween.*

* * * * *

UNITED STATES PATENT AND TRADEMARK OFFICE

CERTIFICATE OF CORRECTION

PATENT NO. : Re. 31,619

DATED : July 3, 1984

INVENTOR(S) : John D. HOLLEY

It is certified that error appears in the above-identified patent and that said Letters Patent is hereby corrected as shown below:

Claim 27, column 10 at line 2, change "place" to -- piece --.

Signed and Sealed this

*Twenty-second* Day of *January 1985*

[SEAL]

*Attest:*

DONALD J. QUIGG

*Attesting Officer* *Acting Commissioner of Patents and Trademarks*